United States Patent [19]

Wallace

[11] 4,043,611

[45] Aug. 23, 1977

[54] HARD SURFACED WELL TOOL AND METHOD OF MAKING SAME

[75] Inventor: Duane W. Wallace, Houston, Tex.

[73] Assignee: Reed Tool Company, Houston, Tex.

[21] Appl. No.: 661,900

[22] Filed: Feb. 27, 1976

[51] Int. Cl.² ........................................... F16C 29/00
[52] U.S. Cl. ..................................... 308/4 A; 308/241
[58] Field of Search ................. 308/4 R, 4 A, 237 R, 308/239, 241; 285/333, 334; 175/325; 166/173, 241

[56] References Cited

U.S. PATENT DOCUMENTS

| 2,334,350 | 11/1943 | Neuhaus | 308/4 A |
| 2,626,190 | 1/1953 | Boice | 308/4 A |
| 3,268,274 | 8/1966 | Ortloff et al. | 308/4 A |

Primary Examiner—Joseph F. Peters, Jr.
Assistant Examiner—Gene A. Church
Attorney, Agent, or Firm—Neal J. Mosely

[57] ABSTRACT

A wear resistant tubular well tool, such as a tool joint, comprises a hollow cylindrical body having a hard metal, such as a coarse-grained sintered tungsten carbide, deposited on a portion of the exterior of the body and a fine-grained hard metal, such as a cast tungsten carbide, deposit covering substantially all of the external surface of said coarse-grained hard metal deposit. The method of making the well tool comprises depositing the coarse-grained hard metal by welding and then casting or fusing the finegrained hard metal over the coarse-grained hard metal layer.

3 Claims, 1 Drawing Figure

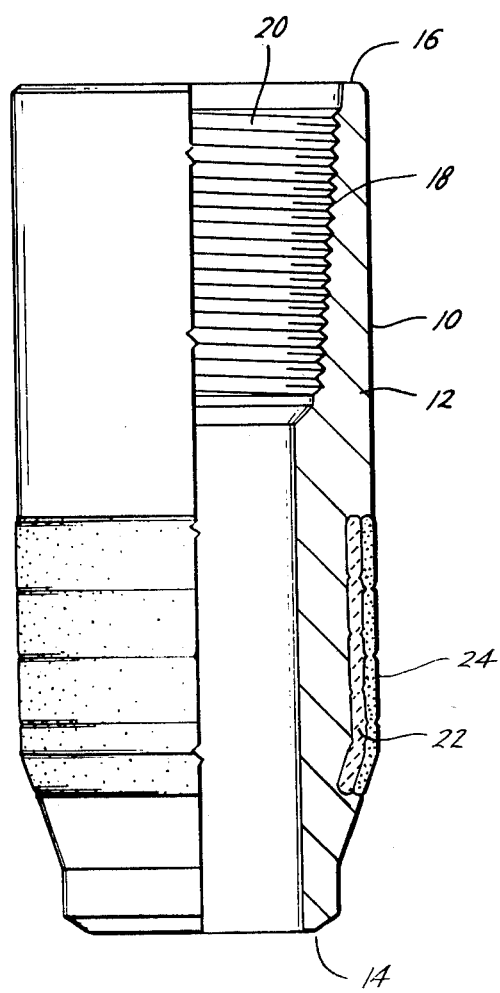

HARD SURFACED WELL TOOL AND METHOD OF MAKING SAME

BACKGROUND OF THE INVENTION

1. Field of the Invention

This invention relates to new and useful improvements in tubular well tools such as tool joints used in the drilling industry and provided with a hard metal coating to protect the joint against excessive wear and to prevent undue wear on the well casing.

2. Brief Discussion of the Prior Art

For many years, tool joints used in the well drilling industry have been protected from excessive wear on their exterior surface by application of a band of hard metal thereon. It has been known that coarse-grained hard metal such as sintered tungsten carbide may be used and will provide a greater resistance to wear but may result in wear of the interior of the well casing. The wear from coarse-grained, sintered carbide has been blamed for expensive fishing jobs and junked holes. Other well tools, such as stabilizers, drill collars and connectors have had hard metal applied thereto and when used within well casing may cause accelerated wear on the casing.

In the co-pending application of Duane W. Wallace, Terry H. Mayo and Olen A. Curry, Ser. No. 607,014, filed Aug. 22, 1975, and assigned to the same assignee as this application, there is described an improved hard surfaced well tool in which a coarse-grained, sintered tungsten carbide is applied around a portion of the exterior surface of a well tool such as a tool joint and then coated with a softer material such as an alloy steel.

SUMMARY OF THE INVENTION

The subject invention provides an improved well tool, such as a tool or the like, having a deposit of coarse-grained hard metal such as sintered tungsten carbide, which is substantially totally immersed beneath a coating of a hard metal of a fine grain structure such as a cast tungsten carbide.

OBJECTS AND FEATURES OF THE INVENTION

An object of the subject invention is to provide an improved tubular well tool, such as a tool joint, which is resistant to wear and causes negligible wear to the well casing in which it is run during drilling.

Another object is to provide an improved tool joint having a greater resistance to exterior wear and which is coated to provide protection against excessive abrasion on the interior of the well casing in which it is run during drilling.

A feature of this invention is the provision of an improved tubular well tool, such as a tool joint, having a coarse-grained hard banding of a material such as a sintered tungsten carbide and coated with a fine-grained hard metal.

Another feature of this invention is the provision of an improved tool joint having an exterior coating of a coarse-grained sintered tungsten carbide which is coated with a fine grained, e.g. cast, tungsten carbide.

Other objects and features of this invention will become apparent from time throughout the specification and claims as hereinafter related.

BRIEF DESCRIPTION OF THE DRAWING

The figure shown is a view in partial section of an improved tool joint illustrating the subject invention.

DESCRIPTION OF A PREFERRED EMBODIMENT

Referring to the drawing by numerals of reference, there is shown a tool joint generally designated 10 which is partly in section and partly in elevation. This drawing illustrates the improved hard banding which provides an improved resistance to abrasion and wear of the tool joint while minimizing wear on the interior of the casing in which the tool joint is run during drilling.

The tool joint 10 comprises a tubular body 12 having one end 14 adapted to be attached to the end of a section of drill string and the other end 16 having threads 18 for releasably connecting to a drill string. The female threaded portion is sometimes referred to as a threaded box 20 which is connected to a male threaded member on a drill string. Alternatively, the tool joint may have a male thread for connection to a female threaded drill string or sub.

The tool joint 10 is provided with a band 22 of a coarse-grained hard metal which is deposited in any approved manner such as by welding. The coarse solid particles of the hard metal are supported in an alloy steel matrix which is welded to and integral and the exterior of the body. The hard metal used is preferably a sintered tungsten carbide.

A layer 24 of fine-grained hard metal is provided covering substantially all of the exterior surface of hard banding 22 as shown in the drawing. The coating layer 24 is preferably of a fine-grained tungsten carbide, such as a cast carbide, and is deposited so that it becomes integral with the coarse-grained layer 22 as by fusion. The layer 24 provides a hard smooth coating over the tougher more wear-resistant layer of sintered carbide 22.

The application of the fine-grained carbide layer over the coarse-grained carbide or hard metal deposit on a tool joint provides an adequate protection for wear on the tool joint and allows the tool joint to be used repeatedly for drilling within a well casing with reduced casing wear. Even when portions of the layer 24 wear away from the hard banding 22 a relatively smooth wear surface is provided without projecting particles of hard metal as are present in the bands 22 not having the layer 24 deposited thereon.

As mentioned above, the present invention has application to other well tools, such as drill collars, stabilizers, connectors and other tools having a layer of hard metal deposited on a portion of the exterior surface. In such tools, the improvement of the present invention provides a layer of fine grained tungsten carbide over at least a portion and usually all of the coarser sintered carbide hard metal deposit and fused therewith.

I claim:

1. A tool joint comprising
   a tubular body,
   at least one band of coarse-grained hard metal in an alloy steel matrix extending circumferentially around the exterior of said tubular body, and
   a continuous fine-grained cast tungsten carbide layer deposited to cover substantially all of said band.

2. A tool joint according to claim 1 wherein said hard metal is sintered tungsten carbide.

3. A tool for use in a well bore comprising a body,
   a deposit of coarse-grained hard metal in an alloy steel matrix on the exterior of said body, and
   a continuous layer of a fine-grained cast tungsten carbide over substantially all of said coarse-grained hard metal deposit and fused with said alloy steel matrix

* * * * *